April 6, 1954   F. A. ANETSBERGER ET AL   2,674,209
DOUGH ROLLER MECHANISM
Filed Aug. 11, 1951   2 Sheets-Sheet 1

INVENTORS:
Frank Anetsberger &
BY Joseph Anetsberger
Sheridan, Davis & Cargill
Att'ys April 6, 1954    F. A. ANETSBERGER ET AL    2,674,209
DOUGH ROLLER MECHANISM
Filed Aug. 11, 1951      2 Sheets-Sheet 2
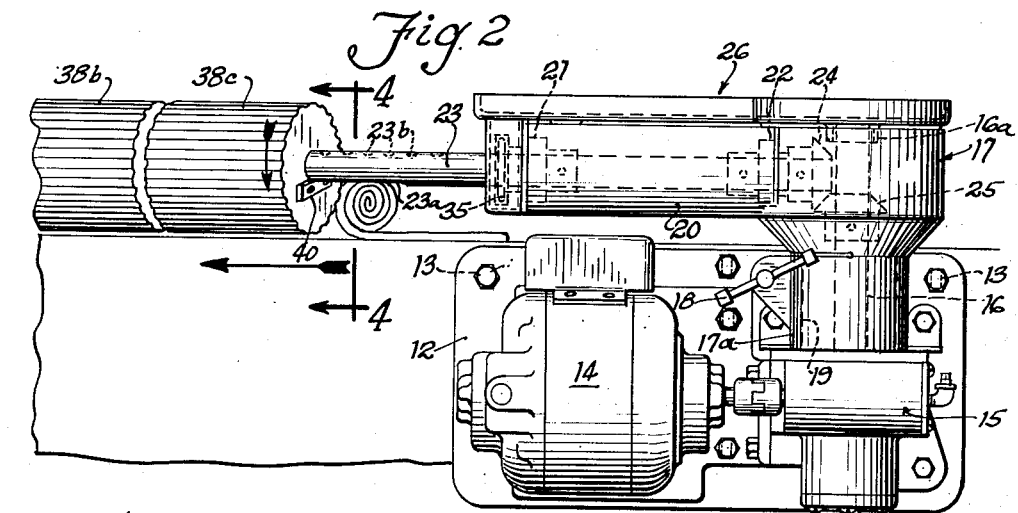
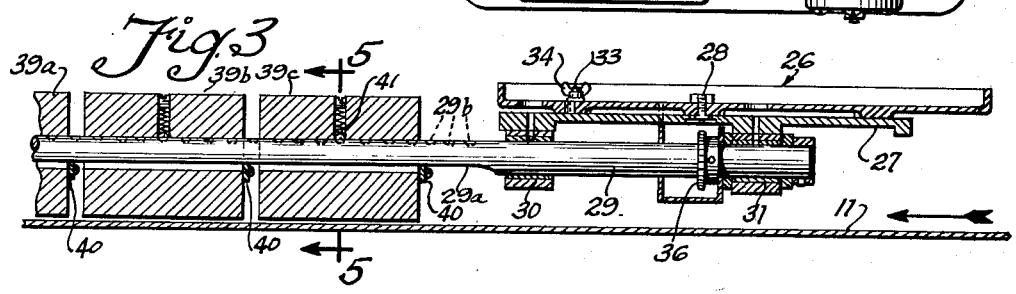
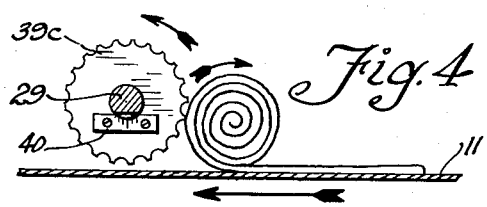
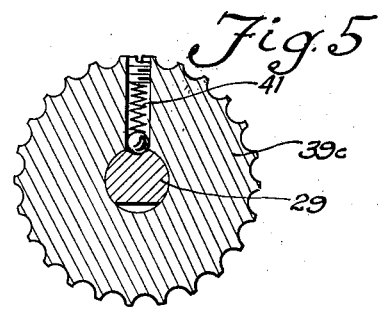
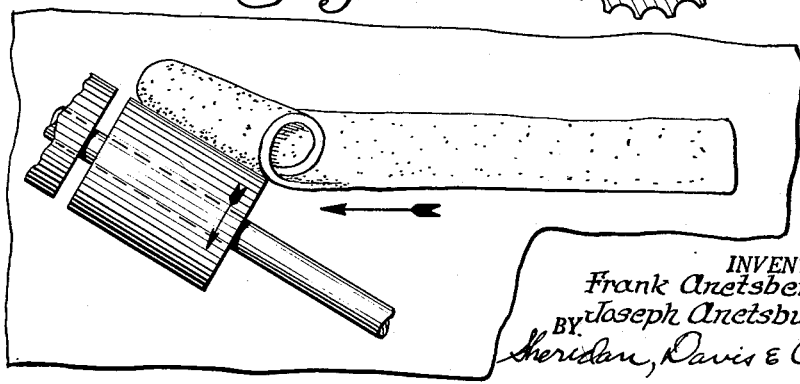
INVENTORS:
Frank Anetsberger &
Joseph Anetsburger
BY Sheridan, Davis & Cargill
Attys Patented Apr. 6, 1954

2,674,209

UNITED STATES PATENT OFFICE 2,674,209

DOUGH ROLLER MECHANISM

Frank A. Anetsberger and Joseph F. Anetsberger, Chicago, Ill., assignors to Anetsberger Brothers, Inc., Northbrook, Ill., a corporation of Illinois Application August 11, 1951, Serial No. 241,426

7 Claims. (Cl. 107—9)

This invention relates to improvements in dough roller mechanism.

In the manufacture of some bakery products, sheeted strips of dough on a moving belt conveyor are rolled progressively into a substantially helical form to form an elongate dough roll, which, as it progresses to a slicing mechanism, is cut into pieces of desired thickness ready for baking or proofing and baking.

Mechanical dough rollers have heretofore been employed for performing the operation mentioned and generally have consisted of a cylindrical roller extending obliquely over the conveyor in the path of the approaching sheeted dough strip. The roller of such a device is rotated about its longitudinal axis in a direction whereby the lower periphery of the roller adjacent the conveyor moves against an end portion of the approaching dough strip and rolls it progressively into an elongate roll which passes around the end of the roller and is carried by the conveyor to the slicing mechanism or is otherwise cut into desired lengths.

In some bakeries, production tables provided with endless belt conveyors are employed which are capable of carrying more than a single strip of sheeted dough and where two strips in adjacent side by side relation are sheeted onto a belt, for example, two dough rollers of the former type above referred to are necessary for rolling the strips into rolled form. Such dough rollers require appropriate mounting means along the side of the table, they must be located in longitudinally spaced relation along the table and, if located on the same side of the table, one roller must be arranged to extend over the adjacent dough sheet into position to engage the remote sheet.

It is an object of the present invention to provide a dual roller mechanism comprising two rollers driven from a single motor or other source of power, both rollers being supported from a single mounting means at one side of the table and one of the rollers being adjustable relative to the other for accommodating the rollers to various spacings between dough sheets to be rolled, or for effecting location of the resulting dough rolls in desired spaced apart positions on the conveyor for alignment purposes as the dough rolls proceed to a dough slicing means or roll sizing or other mechanisms which perform additional operations on the dough preparatory to proofing or baking.

Another object of the invention is to provide a dough roller mechanism the operative roller bodies of which can be elongated or shortened and can be shifted to different axial positions on the respective shafts for accommodating the rollers to various conditions of use.

Other objects of the invention relate to various features of construction and arrangement of parts which will be apparent from a consideration of the following specification and accompanying drawings which show a dough roller mechanism which is illustrative of the present improvements.

In the drawings:

Fig. 2 is a broken side elevational view of the mechanism shown in Fig. 1;

Fig. 3 is a broken sectional view taken on line 3—3 of Fig. 1;

Fig. 4 is a sectional view taken on line 4—4 of Fig. 2 and showing in end elevation one of the dough rollers and illustrating more or less diagrammatically a roll of dough formed by the action of the roller on a traveling strip of sheeted dough;

Fig. 5 is a sectional view taken on line 5—5 of Fig. 3; and

Fig. 6 is a broken elevational view of a roller section and illustrating the progressive formation of a dough roll.

Figure 1:
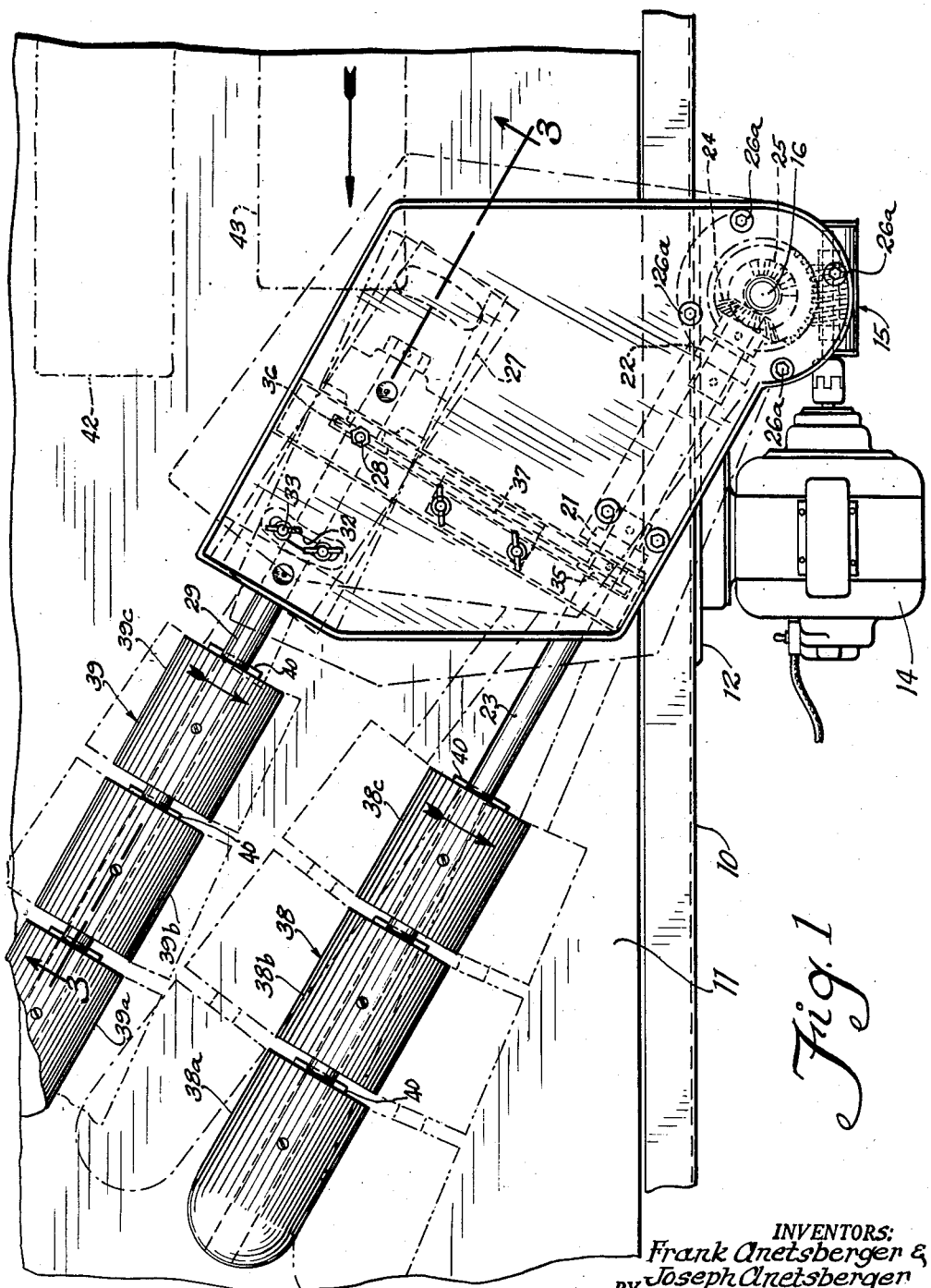
Figure 1 is a broken plan view of a portion of a bakery conveyor table showing the improved dough roller mechanism in operative relation with respect thereto.

In Fig. 1 of the drawing, 10 indicates one of the side frames of the conventional conveyor type bakery table having a conveyor the upper run 11 of which is adapted to receive dough in sheeted strip form, which is to be rolled into an elongate roll or rolls by means of the present improvements.

The improved dough roller mechanism is adapted to be mounted adjacent one side of the conveyor table and preferably is arranged to be mounted on one of the side rails thereof, such as rail 10 shown in Fig. 1. The mounting means comprises a plate 12 which can be attached to the vertical wall of the side rail 10 by any appropriate means which enable its convenient removal, such as screws or the like passing through openings 13 in the plate 12. Secured to the plate 12 is an electrical motor 14 which operates a speed reducing mechanism indicated generally by the numeral 15 which also is secured to the plate. The speed reducing mechanism may be of conventional construction and drives a vertical shaft 16. The shaft extends upwardly into a housing 17, the lower portion 17a of which is split. By means of a screw clamp 18, the cylindrical portion of the sleeve 17a can be tightened upon an interior cylindrical housing portion 19 forming a portion of the housing of the speed reducer, for retaining the casing 17 in angularly adjusted position. The housing 17 is provided with a lateral extension 20 within which is journalled, in bearings 21 and 22, a shaft 23 which at its inner end carries a bevel gear 24 which meshes with a pinion 25 secured to the vertical shaft 16. The vertical shaft 16 is journalled in its upper end in a bushing 16a.

On the upper end of the housing 17 is a plate indicated generally by the numeral 26 which is flanged at its upper edge to rigidify it and secured to the housing by suitable studs or bolts 26a. Pivotally secured to the under side of plate 26 is an adjustable plate 27, the latter being attached as by a stud 28. The plate 27 supports a second roller shaft 29 in a plane co-planar with the shaft 23, said shaft 29 being journalled in bearings 30 and 31 secured to the lower surface of the plate. The upper plate 26 is provided with an arcuate recess 32, upwardly through which projects a threaded stud 33, the stud projecting from the lower plate 27. A wing nut 34 or other clamping means is provided on the stud 33 whereby when the lower plate 27 which carries the shaft 29 has been swung about the pivot 28 to a desired position, tightening of the nut 34 will retain the lower plate and consequently the shaft 29 in the adjusted position relative to the plate 26 and consequently relative to the first shaft 23. A sprocket 35 is secured to the shaft 23 as shown in Fig. 1 and a similar sprocket 36 is secured to the shaft 29. A drive chain 37 passes over the sprockets whereby rotation of shaft 23 by the motor 14 and associated driving mechanism above referred to will effect rotation of shaft 29 in the same direction. The fit of the teeth of the sprockets 35 and 36 with respect to the links of the chain 37 is sufficiently free crosswise of the chain to permit the shaft 29 to be adjusted angularly about the pivot 28 through relatively small angles such as is suggested by dotted lines in Fig. 1 without interfering with the drive of the shaft 29 by the chain.

The shafts 23 and 29 are adapted to carry dough rollers indicated generally by the numerals 38 and 39, respectively. The rollers are of like construction and preferably are formed in cylindrical sections which can readily be removed from the shafts or can be adjusted axially thereon. A complete roller may consist of three or four or a greater or a less number of sections, the sections being longitudinally fluted preferably although plain rollers, not shown, may be used. Referring to Fig. 1, the roller 38 is shown as comprising an end section 38a which is rounded at its forward end and is axially bored to receive the shaft 23. The other two sections 38b, 38c illustrated in the drawing are similar except that both ends are normal to the longitudinal axes.

The roller 39 comprises an end section 39a also rounded at its forward end and two additional sections 39b and 39c which are similar to sections 38b, 38c. Additional sections similar to sections 38b, 38c and 39b, 39c may be provided, said last mentioned two sections being identical as are sections 38a, 39a. The shafts 23 and 29, as illustrated in Figs. 2 and 3, are provided with flat portions 23a and 29a, respectively, throughout the roller supporting portions thereof, and on an opposite portion, the shafts are provided with a series of relatively closely spaced indentations or notches 23b, 29b. Each of the roller sections is bored to receive one of the shafts, and extending across one end portion of each roller section and overlapping partially the end of the bore thereof is a strap or plate 40 which, when the roller section is slid upon a shaft, engages the flat portion of the shaft and prevents rotation of the roller section relative to the shaft. Each of the rollers also is provided with a spring pressed ball detent indicated generally by the numeral 41 for cooperation with the serrations or indentations 23b, 29b of the respective shafts for releasably retaining the roller sections in longitudinally adjusted positions on the shafts.

By reason of the construction described, it will be seen that the roller sections can be moved axially of the shafts or removed therefrom when desired. This construction enables a roller to be elongated by adding one or more sections to the shaft or shortened by removing one or more sections from the shaft. By reason of the adjustment of the roller sections relative to the shaft, the entire roller body formed of the roller sections on the shaft can be shifted toward or away from the outer end of the shaft for the purpose of accommodating the roller or rollers to the width or location of the dough strips on the conveyor 11 as, for example, the dough strips 42 and 43 approach the rollers.

As above stated, the plate 26 and the casing 17 and extension 20 can be swung as a unit about the axis of the drive shaft 16 to change the angular disposition of the roller shafts with respect to the table. Likewise, the shaft 29 can be adjusted independently of the shaft 23 by loosening the wing nut 34 for further accommodating the roller 39 to the location on the conveyor of a sheeted dough strip to be rolled by said roller. In Fig. 1, the approaching ends of two dough strips 42 and 43 on the conveyor 11 are indicated and will, when the ends of the strips come into contact with the respective rollers 39 and 38 which rotate in the direction of the arrows, roll the flat strips into rolls which are generally helical in cross section as indicated in Fig. 4. Such strips, as the rolls are being formed, move parallel with and in contact with the roller surfaces and pass around the rounded ends of the rollers as completed dough rolls whence they may be carried by the conveyor to other mechanism adjacent the end of or above the conveyor which performs other operations thereon, such as a slicing mechanism, for example, which slices the strips into pieces of the desired thickness. Where dough sizing means are employed in conjunction with the slicing mechanism, it is necessary that the rolls of dough on the conveyor be aligned adequately for engagement with the sizing elements, which operate in pairs and engage opposed sides of each roll for supporting the roll momentarily as the slicing blade passes downward through the rolls. Such dough sizers, so called, prevent deformation of the pieces formed by the slicing operation.

While mechanism which is illustrative of the present improvements has been shown and described, it will be apparent that various changes in the details of the illustrated structure may be resorted to without departure from the spirit of the invention defined by the appended claims.

What is claimed is:

1. Dough roller mechanism for use with a horizontal run of a dough conveyor comprising a pair of axially coplanar and laterally spaced apart roller shafts provided with rollers adapted for disposition over the dough conveyor with the axial plane of said shafts parallel with the plane of the conveyor run and each roller in a position relative to the conveyor for engaging and rolling into helical form one of two parallel strips of dough on the conveyor, a source of power for driving one of the roller shafts, power take-off means operable by the last mentioned shaft for driving the other shaft, and means providing for the horizontal adjustment of the one shaft angularly relative to the other.

2. Dough roller mechanism for use with a dough conveyor comprising a casing provided with a motor driven vertical shaft adapted for location adjacent a side of the dough conveyor, a substantially horizontal main plate supported by said casing for swinging movement about said shaft in a horizontal plane above the conveyor, a substantially horizontal roller shaft supported by said main plate and driven by said vertical shaft, a second plate disposed at the lower side of said main plate, a vertical pivot attaching said plates together for relative movement, a second roller shaft supported by said second plate axially co-planar with said first roller shaft, a driven sprocket secured to said second shaft in vertical alignment with said pivot, a sprocket on said first roller shaft, a driving sprocket chain passing around said sprocket whereby said second roller shaft is rotatable by said first shaft and accommodates limited pivotal movement of the second roller shaft about the axis of said pivot to and from parallelism with said first roller shaft, and rollers on and driven by said shafts.

3. Dough roller mechanism for use on a dough conveyor for concurrently rolling into helical form progressively two parallel strips of dough on the conveyor comprising a first driven roller shaft adapted for disposition over the dough conveyor, means swingably supporting said shaft over the conveyor in parallelism therewith, a second roller shaft, means pivotally attaching said second shaft to said swingable supporting means whereby said second shaft is swingable over the conveyor in parallelism therewith in unison with said first shaft and can be moved about said pivot means in parallelism with said conveyor and angularly relative to said first shaft, rollers on and rotatable by said shafts, and drive means for said second shaft operable by said first shaft.

4. Dough roller mechanism for use on a dough conveyor comprising a motor operated mechanism adapted for attachment at one side of the conveyor and including a vertical drive shaft and supporting casing, a horizontal supporting plate supported by said casing for swinging movement to selected positions in a horizontal plane above the dough conveyor, means for securing the plate in adjusted positions, a first dough roller shaft beneath said plate and secured thereto, means for driving said dough roller shaft from said vertical drive shaft, a second dough roller shaft axially co-planar with said first dough roller shaft, means securing said second dough roller shaft to said plate for pivotal movement in the plane of said dough roller shafts, rollers for said dough roller shafts, and means operable by said first dough roller shaft for operating said second dough roller shaft.

5. Dough roller mechanism adapted for use on a dough conveyor structure comprising drive means including a vertical drive shaft and supporting casing therefor adapted for attachment to the side of the dough conveyor structure, a second casing structure adjustably supported by said first mentioned structure for adjustment about a vertical axis, a horizontal plate supported by said second casing structure and adapted to be swung to adjusted positions over the dough conveyor, a first horizontal dough roller shaft supported by said plate and driven by said vertical drive shaft, a second dough roller shaft, means pivotally attached to said plate and supporting said second dough roller shaft axially co-planar with said first dough roller shaft, means for limiting the adjustment of said pivotal means relative to the plate, rollers for said dough roller shafts, a chain sprocket on said second dough roller shaft at a position wherein an extension of the axis of said pivotal means passes diametrically through said sprocket, a drive sprocket on said first dough roller shaft, and a drive chain on said sprockets for driving the second dough roller shaft from said first shaft.

6. In a dough roller structure for use on a dough conveyor, a dough roller shaft, drive means for the shaft, said shaft being provided with a series of notches along one side thereof, and a roller for use on the shaft comprising a series of roller sections having axial passages enabling the sections to be slid on said shaft into driven engagement therewith and each provided with means for engaging a notch in the shaft for releasably securing the sections in longitudinally adjusted position on the shaft.

7. Dough roller mechanism for use with a horizontal dough conveyor for concurrently rolling into helical form progressively two parallel strips of dough on the conveyor, said mechanism comprising a plate, means swingably supporting the plate on a vertical axis for horizontal adjustment over the conveyor, a rotary shaft carried by the plate for disposition thereby over the conveyor in parallel relation with respect to the conveyor, power means for rotating the shaft, a second shaft, means pivotally securing the second shaft to the plate in parallel relation with the conveyor and for angular adjustment horizontally relative to said first shaft, means driven by said first shaft for driving said second shaft, and rollers on said shafts each for engaging and rolling into helical form one of two parallel strips carried thereto by the conveyor.

References Cited in the file of this patent

UNITED STATES PATENTS

| Number | Name | Date |
| --- | --- | --- |
| Re. 22,399 | Fonken | Dec. 7, 1943 |

FOREIGN PATENTS

| Number | Country | Date |
| --- | --- | --- |
| 208,197 | Great Britain | Dec. 19, 1923 |